Oct. 25, 1960
K. E. SNYDER
2,957,735
SEAL STRUCTURE
Filed March 14, 1958
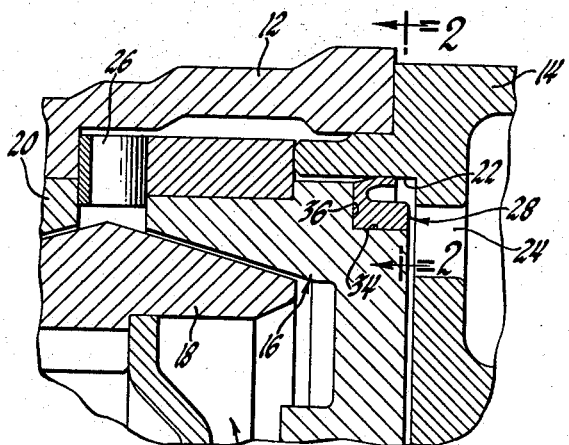
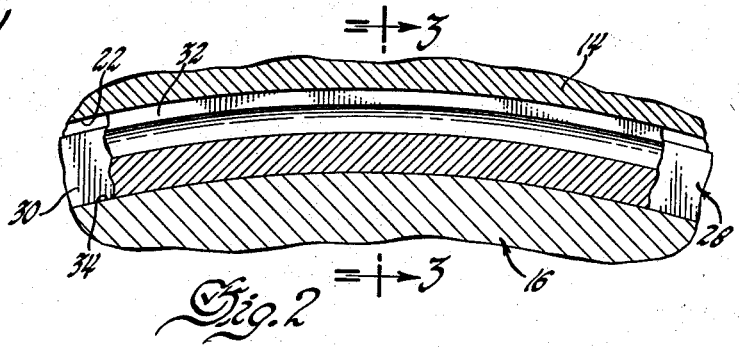
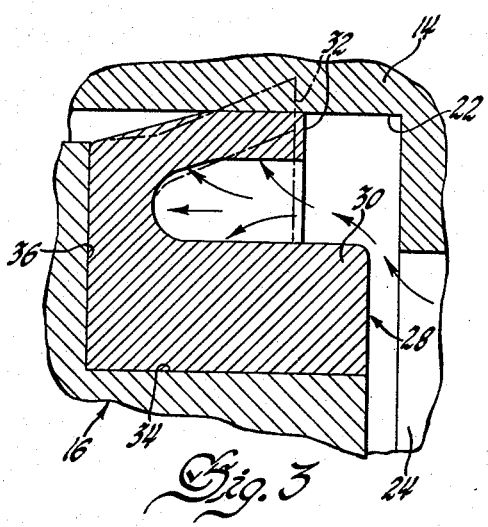
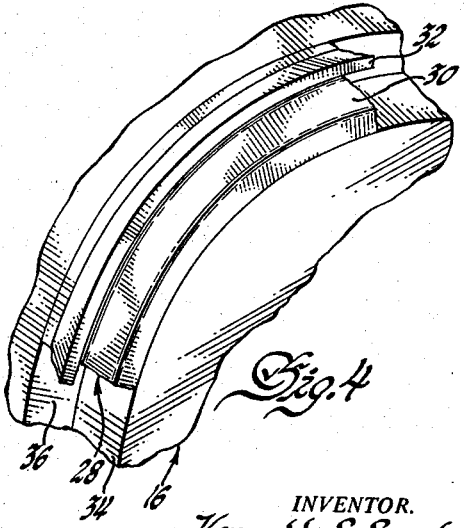
INVENTOR.
Kenneth E. Snyder
BY
W. C. Middleton
ATTORNEY

United States Patent Office 2,957,735
Patented Oct. 25, 1960

2,957,735
SEAL STRUCTURE

Kenneth E. Snyder, Northville, Mich., assignor to General Motors Corporation, Detroit, Mich., a corporation of Delaware Filed Mar. 14, 1958, Ser. No. 721,552

1 Claim. (Cl. 309—23)

This invention relates to seals for preventing escape of pressure from between relatively movable parts.

It is common practice to install ring-type seals within a circular groove afforded in one of two relatively movable parts. The two side walls of the groove, in addition to the bottom, all offer sealing surfaces and also assist in aligning and supporting the seal. A groove, of course, is desirable, however, machining presents problems since, generally, the tolerances must be relatively close and when the groove is narrow breakage is frequent with the small cutting tools. Moreover, if the groove occurs near the edge of the part, the side wall next to this edge is easily broken.

With the foregoing in mind, the present invention contemplates the provision of seal structure that is simplified in construction, that does not require accurately machined grooves to be effective, that is self-supporting and that is inherently maintained in proper alignment by the construction. More particularly, the invention proposes a seal structure that, in addition to being self-supporting and self-aligned, utilizes pressure to assist in the maintenance of the proper alignment and support. Moreover, by the invention the seal structure when under pressure is arranged to provide an even more effective seal.

In carrying out the invention a seal constructed according to the invention is positioned on an annular ledge notched into an external corner of one of two relatively movable parts. The diameter of the seal is less than the diameter of the ledge and hence the expansion of the seal required for disposition on the ledge retains the seal in position against a side wall of the notched corner. When pressure is applied, this seal is moved into tighter engagement with the ledge and the side wall while a lip portion of the seal is moved also into tighter engagement with a sealing surface on the other part so that when under pressure, the seal effectiveness is considerably increased.

The foregoing and other objects and advantages of the invention will be apparent from the following description and from the drawings in which:

Figure 1 shows an installation embodying and demonstrating the principles of the invention;

Figure 2 is a fragmentary sectional view of the seal along line 2—2 of Figure 1;

Figure 3 is an enlarged sectional view of the seal along line 3—3 of Figure 2; and Figure 4 is a fragmentary perspective view of the seal with the lip portion in the free position.

Referring to Figure 1, the numeral 10 designates generally a fluid pressure engaged cone brake embodying the present invention. The brake 10 is enclosed by front and rear housings 12 and 14 and comprises a cone piston 16, a double cone member 18, and a reaction cone 20 suitably secured to the front housing 12. The rear housing 14 is counterbored at the forward face to provide an internal peripheral sealing surface 22 and has an opening 24 therein for transferral of fluid pressure from some appropriate source (not shown). When fluid pressure is supplied, the resultant pressure action on the surface of the cone piston 16, moves the cone piston to the left against the bias from a wave-type spring 26 and causes the mating cone surfaces on the member 18 and piston 16 to engage. As a result, cone member 18 also moves to the left until the surfaces on the reaction cone member 20 and member 18 are likewise engaged, whereupon the member 18 will be locked against rotation and the brake 10 is engaged.

Leakage of fluid pressure from between the outer periphery of the cone piston 16 and the surface 22 on the rear housing 14 is prevented by an annular seal 28. The seal 28 is made of resilient material such as either artificial or natural rubber and, as best shown in Figure 3, is formed with a body portion 30 and a pliant integral lip portion 32. The body portion 30 as may be observed includes a larger mass of resilient material than that of the lip portion 32. To accommodate the seal 28, the rear external corner of the cone piston 16 is notched to provide an annular ledge or seal seat surface 34 defined by a single seal side wall 36. The seal 28 is retained in the correct position depicted against a side wall 36 by the rubber band effect produced from having the inner diameter of the body portion 30 made a predetermined amount smaller than the diameter of the ledge 34. Hence, when the seal 28 is installed on the ledge 34, the body portion 30 must be stretched. The width of the seal 28 should be adequate for the desired seal and therefore, it must be kept in mind that the stretching during installation causes the body portion 30 to elongate somewhat. This, of course, is desirable since a larger sealing area is provided with a smaller seal.

Prior to fitting the cone piston 16 within the bore in the rear housing 14, the pliant lip portion 32 has a free position, shown by the dotted lines in Figure 3 and also depicted in Figure 4. After the piston 16 is in position the pliant lip portion 32 is forced downwardly by the rear housing surface 22 to the solid line position in Figure 3 and as viewed in Figure 2 the pliant aspect of this lip portion affords an upward bias that urges the lip portion 32 snugly into engagement with the surface 22 so as to produce an effective seal in proper area. In addition, as mentioned, the seal 28 is fitted tightly against the side wall 36 to increase the total sealing area.

Particularly desirable is the fact that when the seal 28 is under pressure the pressure itself enhances the foregoing sealing relation. For when fluid pressure is supplied through the opening 24 in the rear housing 14, as indicated by the arrows in Figure 3, the seal body portion 30 is urged by the pressure into tighter engagement with the ledge 34 and the side wall 36. Furthermore, the fluid pressure urges the lip portion 32 into still tighter engagement with the rear housing surface 22. This assistance afforded by the fluid pressure also insures that the seal is properly supported and aligned when the piston 16 is moved to the left. Movement of the piston 16 to the right is not a concern since there is no tendency but in fact, the contrary, for the seal member to move off the ledge 34.

As can be seen, the invention provides seal structure which does not require accurately machined grooves, nor expensive and complex aligning and supporting devices for the seal. The supporting structure for the seal need not be accurately maintained dimensionally since the seal is both self-aligning and supporting. Moreover, operationally when the sealing requirements are greatest, the seal is the most effective due to the utilization of the pressures to increase the sealing afforded and the assurance that the seal is properly aligned and supported.

The invention is to be limited only by the following claim.

I claim:

In combination, a housing having a bore therein, a piston positioned within the bore and movable axially relative to the housing, the piston having a face with an external corner thereof relieved commencing at the piston face so as to form an open-ended annular seal seat with a single side wall, and a seal of resilient material positioned on the seal seat and in engagement with the side wall, the seal having the body portion thereof of smaller diameter than that of the seal seat so as to form a tight fit therewith along the entire axial extent of the body portion for maintaining the axial position thereof and a lip portion integral with and extending from the body portion to engage the bore periphery and provide a sealing engagement therewith, said body portion including a larger mass of resilient material than that of the lip portion, the seal being arranged so that when under pressure the body portion and the lip portion will be urged into tighter engagement, respectively, with the side wall of the piston and the periphery of the housing bore.

References Cited in the file of this patent

UNITED STATES PATENTS

| | | |
|---|---|---|
| 2,081,040 | King | May 18, 1937 |
| 2,111,312 | Clark | Mar. 15, 1938 |
| 2,192,012 | Brie | Feb. 27, 1940 |
| 2,509,436 | Isenbarger | May 30, 1950 |
| 2,686,402 | Samuel | Aug. 17, 1954 |
| 2,726,124 | Boyce | Dec. 6, 1955 |
| 2,742,333 | Taylor | Apr. 17, 1956 |